(12) United States Patent
Oh et al.

(10) Patent No.: US 7,436,624 B2
(45) Date of Patent: Oct. 14, 2008

(54) POLE BASE LOADING APPARATUS AND MAIN CHASSIS FOR MAGNETIC RECORDING/READING DEVICE

(75) Inventors: Jeong-hyeob Oh, Anyang-si (KR); Chung-hum Baik, Suwon-si (KR); Young-ho Cho, Suwon-si (KR); Myoung-joon Kim, Suwon-si (KR); Bong-joo Kim, Suwon-si (KR); Jun-young Kim, Suwon-si (KR); Jae-kab Seo, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 421 days.

(21) Appl. No.: 11/070,197

(22) Filed: Mar. 3, 2005

(65) Prior Publication Data

US 2005/0280928 A1    Dec. 22, 2005

(30) Foreign Application Priority Data

Jun. 16, 2004    (KR) .................... 10-2004-0044552

(51) Int. Cl.
*G11B 15/665*    (2006.01)
(52) U.S. Cl. ....................................... 360/85
(58) Field of Classification Search .................. 360/85
See application file for complete search history.

(56) References Cited

U.S. PATENT DOCUMENTS

| 5,099,369 | A | * | 3/1992 | Kakuta et al. | ................. | 360/85 |
| 5,444,585 | A | * | 8/1995 | Baek | ........................... | 360/85 |
| 6,788,491 | B2 | * | 9/2004 | Hayashi | ...................... | 360/85 |
| 7,092,201 | B2 | * | 8/2006 | Choi et al. | .................... | 360/85 |
| 2003/0112548 | A1 | | 6/2003 | Hayashi | ...................... | 360/85 |

FOREIGN PATENT DOCUMENTS

| EP | 0 859 360 A1 | 8/1998 |
| KR | 1997-0003698 | 10/1995 |

\* cited by examiner

*Primary Examiner*—Jefferson Evans
(74) *Attorney, Agent, or Firm*—Roylance, Abrams, Berdo & Goodman, LLP

(57) ABSTRACT

A pole base loading apparatus and a main chassis for a magnetic recording/reading device having an improved structure. The pole base loading apparatus includes a pair of pole base units for guiding a tape so that the tape is wound around a head drum as it reciprocates on a main chassis, a pair of loading gears respectively linked to the pole base units and gear-engaged with each other, and a loading unit for rotating the loading gears. At least one of the pair of loading gears has a hook installed therein so that the loading gear is coupled to the main chassis.

5 Claims, 4 Drawing Sheets

POLE BASE LOADING APPARATUS AND MAIN CHASSIS FOR MAGNETIC RECORDING/READING DEVICE

CROSS-REFERENCE TO RELATED APPLICATIONS

This application claims the benefit under 35 U.S.C. §119(a) of Korean Patent Application No. 10-2004-0044552 filed in the Korean Intellectual Property Office on Jun. 16, 2004, the entire disclosure of which is hereby incorporated by reference.

BACKGROUND OF THE INVENTION

1. Field of the Invention

The present invention relates to a magnetic recording/reading device. More particularly, the present invention relates to a pole base loading apparatus and a main chassis for a magnetic recording/reading device.

2. Description of the Related Art

In general, a magnetic recording/reading device such as a video cassette tape recorder, camcorder, and the like, is a device for recording information on a recording medium such as a magnetic tape and reading the information recorded on the recording medium.

Referring to FIG. 1, a magnetic recording/reading device includes a main chassis 10 in which a head drum 11 is rotatably installed, a sub-chassis 20 slidably installed in the main chassis for reciprocation, a pair of reel tables 21 rotatably installed in the sub-chassis 20 for driving the tape reels of a cassette tape, a pair of pole base units 13 and 14 for guiding the tape so that the tape is wound around the head drum 11 when a tape cassette mounted on the sub-chassis 20 is loaded, and a pole base loading device for loading the pole base units 13 and 14.

The respective pole base units 13 and 14 are installed in a pole base guide plate 15 mounted on the main chassis to reciprocate over a predetermined distance. Each of the respective pole base units 13 and 14 is provided with a pole base, a tape guide roller and a fixed pole installed in the pole base.

The pole base loading device includes first and second loading gears 31 and 32 rotatably installed in the pole base guide plate 15, link members 34 and 35 for linking the respective loading gears 31 and 32 to the pole base units 13 and 14, respectively, and a plurality of power transmission gears 36, 37 and 38 for transmitting a driving force of a driving motor 16 to the loading gear 31.

When the power transmission gear 38 receives the driving force of the driving motor 16 and rotates, the first and second loading gears 31 and 32, which interlock with each other, rotate simultaneously. Thus, the link members 34 and 35 rotate, and their knuckles are unfolded to move the pole base units 13 and 14 to the left/right side of the head drum 11.

Referring to FIG. 2, the respective loading gears 31 and 32 are fixed to the guide plate 15 by riveting studs 41 and 42 into the steel plate of the guide plate 15, and forming stepped portions 41a and 42a at the lower ends of the studs 41 and 42, respectively. The stepped portions 41a and 42a pass through stud holes of the loading gears 31 and 32, and are hooked on projections 31a and 32a prepared at the center of a lower part of the loading gears 31 and 32. Accordingly, the loading gears 31 and 32 are fixed to the studs 41 and 42 that serve as shafts, and thus the loading gears can rotate wherein the escape of the loading gears in upper or lower directions is prevented.

According to the conventional pole base loading apparatus as constructed above, the stepped portions 41a and 42a should be formed on both of the studs 41 and 42 that serve as shafts, and the projections 31a and 32a of the gears should be inserted into and coupled to the stepped portions 41a and 42a in order to prevent the escape of the loading gears 31 and 32.

However, the studs 41 and 42 are typically made of metal, and the stepped portions 41a and 42a are formed on the metal studs by a cutting process. Since this cutting process is manually performed, the manufacturing process is further complicated and the manufacturing cost is further increased.

Accordingly, a need exists for a system and method for securing the loading gears which simplifies construction and reduces manufacturing costs.

SUMMARY OF THE INVENTION

The present invention has been developed in order to solve the above and other problems associated with the conventional devices. An aspect of the present invention is to provide a pole base loading apparatus and a main chassis for a magnetic recording/reading device having an improved structure.

The foregoing and other objects and advantages are substantially realized by providing a pole base loading apparatus for a magnetic recording/reading device according to an embodiment of the present invention which comprises a pair of pole base units reciprocating on a main chassis and guiding a tape to be wound around a head drum, a pair of loading gears respectively linked to the pole base units and gear-engaged with each other, and a loading unit for rotating the loading gears, wherein at least one of the pair of loading gears has a hook integrally installed therein so that the loading gear is coupled to the main chassis.

It is preferable that a guide part for guiding the hook moved by the rotation of the loading gears is further formed on the main chassis. It is also preferable to provide an escape part having an extended outer diameter at one end of the guide part so as to allow a free entrance of the hook and allow the lesser diameter of the guide part to be coupled to the hook.

It is also preferable that the pair of loading gears include a first loading gear rotatably inserted onto and coupled to a first shaft part projected from a lower part of the main chassis, and a second loading gear having a small-scaled gear part rotatably inserted onto and coupled to a second shaft part projected from the lower part of the main chassis and gear-engaged with the first loading gear, a large-scaled gear part connected to the loading unit and overlapping the first loading gear so as to prevent the first loading gear from escaping the first shaft part, and a hook coupled with the guide part.

According to the pole base loading apparatus as constructed above in accordance with an embodiment of the present invention, the assembling process for installing the loading gears is simplified. By forming the hook on the loading gear body and coupling the hook directly to the main chassis, the apparatus can be produced by a press molding process instead of a machining (or cutting) process, as required for forming the multistage grooves on the shaft member stud in order to fix the loading gear, and thus the manufacturing costs can be reduced.

BRIEF DESCRIPTION OF THE DRAWINGS

The above aspects and features of the present invention will become more apparent by describing certain exemplary embodiments of the present invention with reference to the accompanying drawings, in which.

Throughout the drawings, like reference numerals will be understood to refer to like parts, components and structures.

DETAILED DESCRIPTION OF EXEMPLARY EMBODIMENTS

Figure 1:
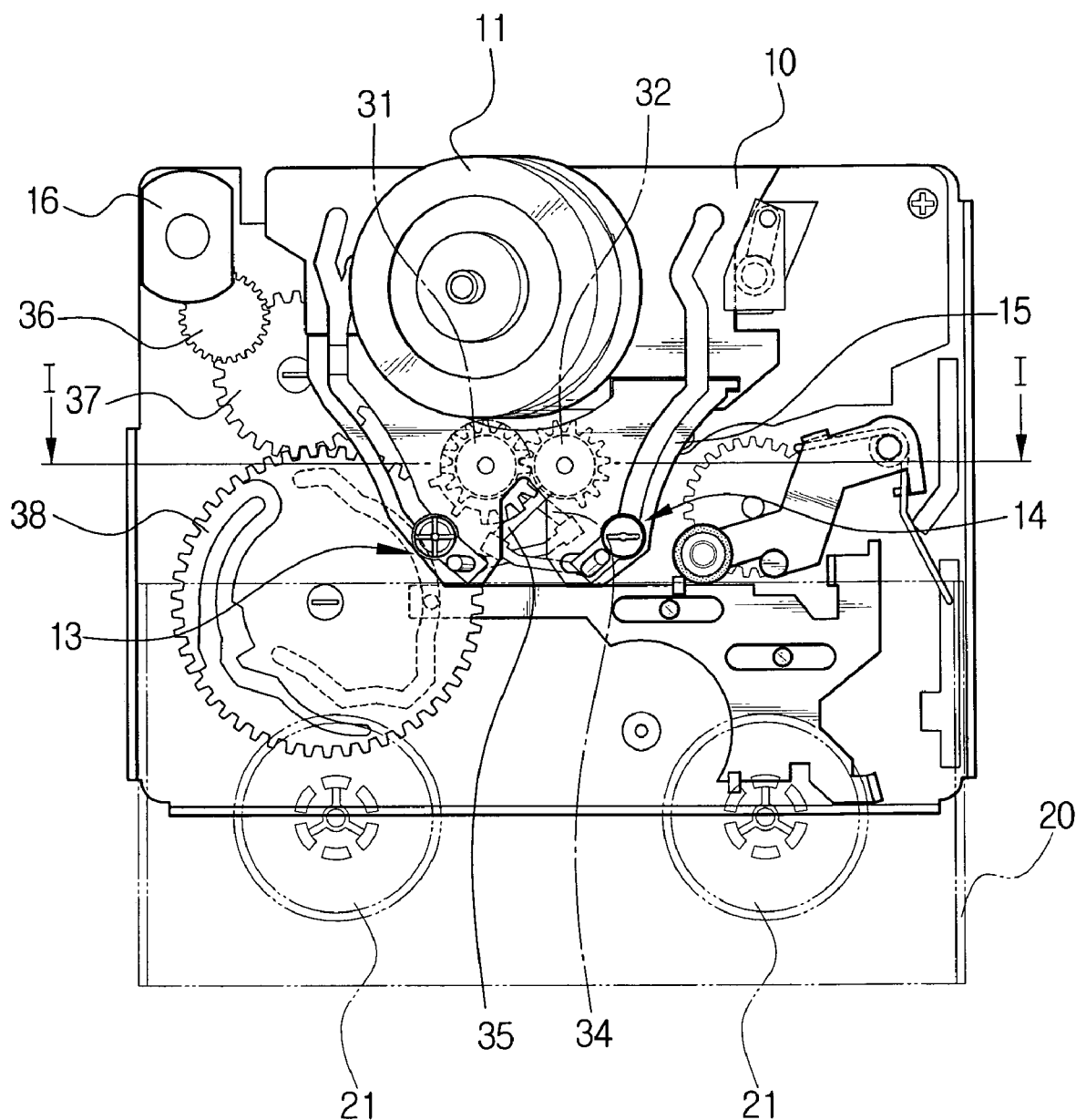
FIG. 1 is a plan view schematically illustrating a conventional magnetic recording/reading device.
Figure 2:
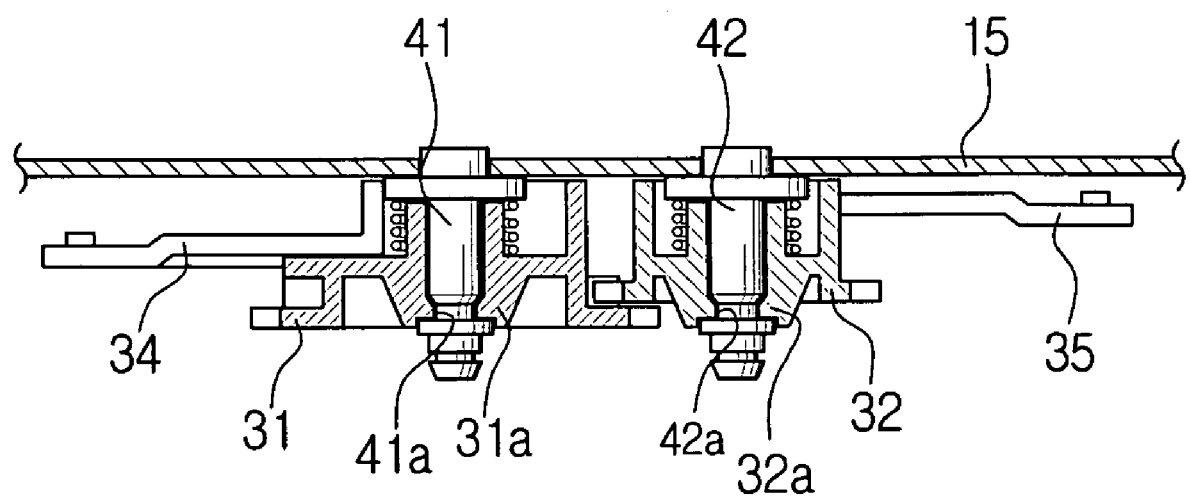
FIG. 2 is a cross-sectional view taken along the line I-I in FIG. 1.

Certain exemplary embodiments of the present invention will now be described in greater detail with reference to the accompanying drawings.

In the following description, the same drawing reference numerals are used for the same elements even in different drawings. The matters defined in the description, such as detailed construction and element descriptions, are provided to assist in a comprehensive understanding of the invention. Also, functions or constructions well known to those skilled in the art are omitted for clarity and conciseness.

Figure 3:
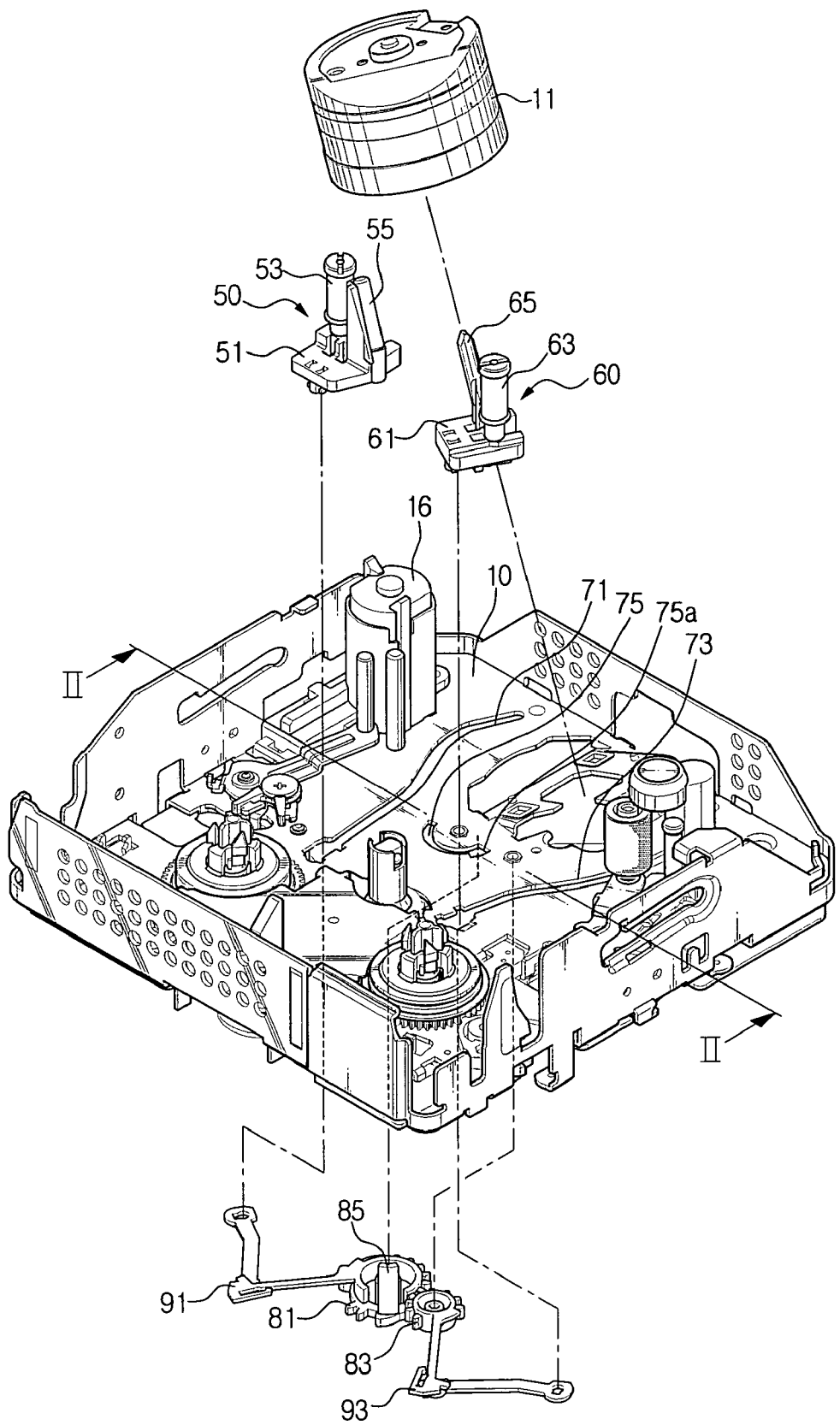
FIG. 3 is an exploded perspective view of a magnetic recording/reading device to which a pole base loading apparatus is applied according to an embodiment of the present invention.
Figure 4:
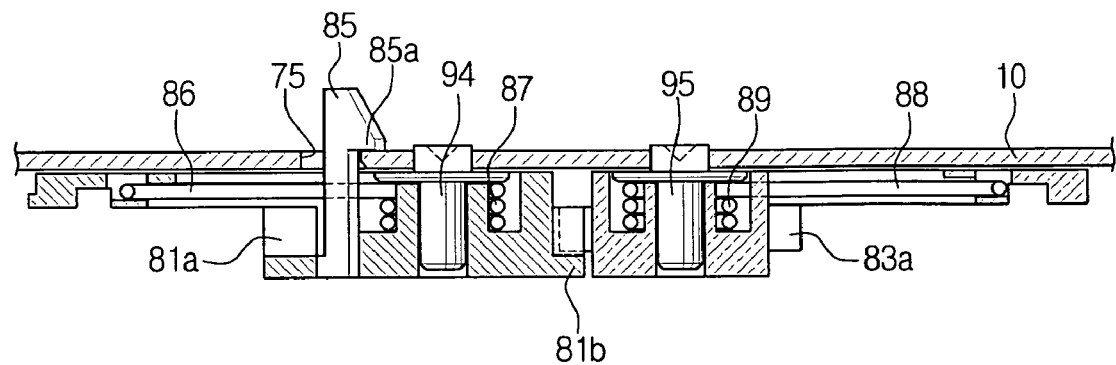
FIG. 4 is a cross-sectional view taken along the line II-II in FIG. 3 when the pole base loading apparatus of FIG. 3 is assembled.
Figure 5:
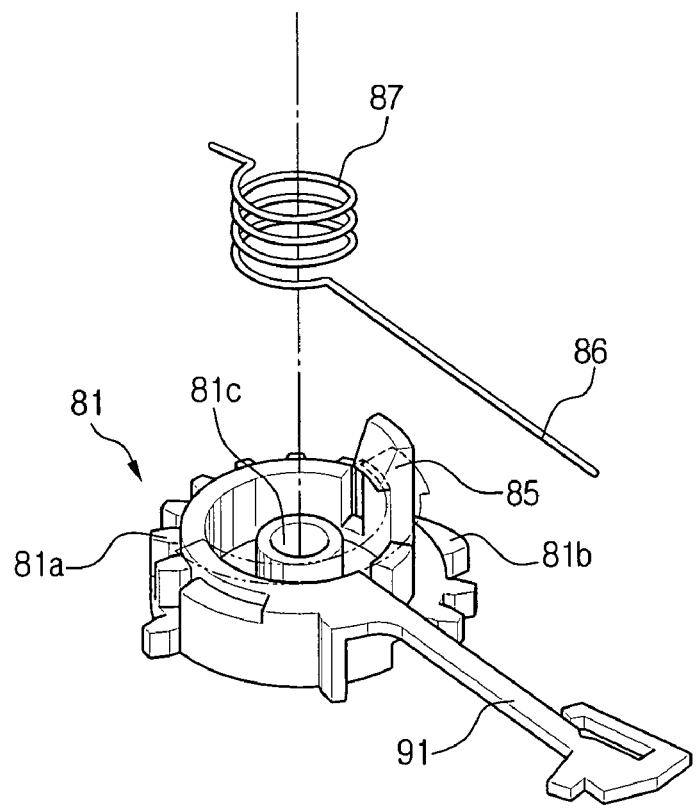
FIG. 5 is an exploded perspective view of a main part of FIG. 4.

FIG. 3 is an exploded perspective view of a magnetic recording/reading device to which a pole base loading apparatus is applied according to an embodiment of the present invention. FIG. 4 is a cross-sectional view taken along the line II-II in FIG. 3 when the pole base loading apparatus of FIG. 3 is assembled, and FIG. 5 is an exploded perspective view of a main part of FIG. 4.

Referring to FIG. 3, the pole base loading apparatus for a magnetic recording/reading device according to an embodiment of the present invention includes a pair of pole base units 50 and 60 installed so as to reciprocate, respectively, along guide rails 71 and 73 provided on a main chassis 10 on which a head drum 11 is mounted, first and second loading gears 81 and 83 linked to the pole base units 50 and 60, respectively, and a loading unit (not illustrated) for rotating the loading gears 81 and 83.

The pole base units 50 and 60 guide the tape from a tape cassette placed in the main chassis 10 to draw the tape to both sides of the head drum 11. The pole base units 50 and 60 include pole bases 51 and 61 moving along the guide rails 71 and 73, tape guide rollers 53 and 63 and guide poles 55 and 65 installed on the pole bases 51 and 61, respectively. This construction of the pole base units 50 and 60 is well known to those skilled in the art.

In an exemplary embodiment of the present invention, the guide rails 71 and 73 are formed on the main chassis 10, but in yet other embodiments of the present invention they may be provided on a separate base member (not illustrated). For example, the guide rails 71 and 73 may be formed on a separate rail plate 15 installed in the main chassis 10 as shown in FIG. 1, and the rail plate 15 may be coupled to the main chassis 10.

The first and second loading gears 81 and 83 as shown in FIG. 3, are rotatably installed on the lower part of the main chassis 10 and are gear-engaged with each other. Accordingly, when the loading gears 81 and 83 rotate, links 91 and 93 rotate together to move the pole base units 50 and 60, respectively.

As shown in FIG. 5, at least one of the loading gears 81 and 83, for example, the first loading gear 81, has a hook 85 configured to be directly coupled to the main chassis 10. The hook 85 is formed to extend from an outer periphery of the first loading gear 81 body. By the coupling of the hook 85 and the main chassis 10, the loading gear 81 is fixed to the main chassis 10. For the coupling of the hook 85, a hook guide part 75 is provided in the main chassis 10, which guides the movement of the hook 85 and which further includes an escape part 75a provided at one end thereof. The hook guide part 75 is formed around a stud 94 that serves as a rotating shaft of the loading gear 81 and hook 85. The hook 85 is inserted into the escape part 75a. It is preferable that the hook guide part 75 is in the form of a slit. Accordingly, the hook 85 can move along the hook guide part 75, as indicated by the dotted line of FIG. 5, by the rotation of the first loading gear 81. As shown more clearly in FIG. 3, the escape part 75a of the hook guide part 75 has an outer diameter that is extended to be longer than the other parts of guide part 75 so that it allows a free entrance of the hook 85 and allow the lesser diameter of the guide part 75 to be coupled to the hook. The head 85a (see FIG. 4) of the hook 85 can then be coupled to the escape part 75a in a one-touch manner.

Referring to FIGS. 4 and 5, the respective loading gears 81 and 83 are rotatably inserted onto the studs 94 and 95 which are fixed to the main chassis 10. These studs 94 and 95 serve as the shafts of the loading gears 81 and 83, respectively. As shown in the drawings, the bodies of the studs 94 and 95 are formed on the lower part of the main chassis 10 and extend straight from the chassis without bends, contours, or angles. Unlike the loading gears 81 and 83, the studs 94 and 95 are made of metal. Accordingly, the studs can be conveniently manufactured by a press molding process.

The first loading gear 81 has a small-scaled gear part 81a engaged with a gear part 83a of the second loading gear 83, and a large-scaled gear part 81b selectively engaged with the loading unit. The loading unit is comprised of a driving motor 16 installed in the main chassis 10 and a plurality of gears as described above in reference to FIG. 1 for transmitting a driving force generated from the driving motor 16 to the first loading gear 81. The small-scaled gear part 81a and the large-scaled gear part 81b of the first loading gear 81 are stepped with different heights and radial diameters. Specifically, the large-scaled gear part 81b is formed at a lower end portion of the small-scaled gear part 81a, and the large-scaled gear part 81b has a diameter larger than that of the small-scaled gear part 81a. Accordingly, the large-scaled gear part 81b is installed so that it overlaps, or captures the gear part 83a of the second loading gear 83, and prevents the second loading gear 83 from escaping from the stud 95 that serves as a shaft for the second loading gear 83.

Referring to FIGS. 3 and 5, one end of the link member 91 and 93 is coupled to the loading gear 81 and 83, and the other end thereof is hinge-coupled to the pole bases 51 and 61, respectively. It is preferable that the link members 91 and 93 and the loading gears 81 and 83 are formed having a body wherein the convenience in assembling the link members 91 and 93 and the manufacturing cost thereof is taken into consideration. It is also preferable that the link members 91 and 93 are made of a resilient material that is the same or substantially the same as the loading gears 81 and 83. Accordingly, even if the second loading gear 83 is further rotated in a loading direction in a state wherein the pole base units 50 and 60 are in contact with the end portions of the guide rails 71 and 73 during a loading operation of the magnetic tape, the link members 91 and 93 can be resiliently bent without harm.

Also, referring again to FIGS. 4 and 5, an iron core 86 can be installed in the link member 91 in order to prevent plastic deformation of the link member 91. One end of the iron core 86 is fixed to an outer periphery of the loading gear 81 and the other end thereof is fixed to a mounting groove (not illustrated), so that the iron core 86 serves as a reinforcement means for the link member 91. In an embodiment of the present invention shown in FIG. 5, a torsion spring 87, one end of which is extended along the link member 91 as the iron core 86, is further installed in a center shaft hole 81c of the loading gear to which the stud 94 is coupled. In the same manner, an iron core 88 and a torsion spring 89 are also installed in the second loading gear 83.

Hereinafter, a method of assembling the pole base loading apparatus in accordance with an embodiment of the present invention will be described in greater detail.

First, the respective studs 94 and 95 are assembled in the main chassis 10, and then the second loading gear 83 is inserted onto the stud 95. Thereafter, the first loading gear 81 is inserted onto the stud 94 so that it covers a part of the second loading gear 83, and the hook 85 of the first loading gear 81 is coupled to the hook guide part 75 formed on the main chassis 10. After assembling, the second loading gear 83 is supported by the large-scaled gear part 81b of the first loading gear 81 to prevent the escape of the second loading gear 83, and the first loading gear 81 is prevented from escaping from the main chassis 10 by the hook 85.

Although in embodiments of the present invention described above, the hook 85 is formed only on the first loading gear 81 and assembled with the hook guide part 75 formed on the main chassis 10, the present invention is not limited thereto. The hook may be formed on one or both of the first and second loading gears 81 and 83 and assembled with the hook guide part 75, or may be provided on the second loading gear 83.

The foregoing embodiments and advantages are merely exemplary and are not to be construed as limiting the present invention. The present teachings can be readily applied to other types of apparatuses. Also, the description of the embodiments of the present invention is intended to be illustrative, and not to limit the scope of the claims, and many alternatives, modifications, and variations will be apparent to those skilled in the art.

What is claimed is:

1. A pole base loading apparatus for a magnetic recording/reading device, comprising:
   a pair of pole base units reciprocating on a main chassis and guiding a tape to be wound around a head drum;
   a pair of loading gears respectively linked to the pole base units and gear-engaged with each other; and
   a loading unit for rotating the loading gears, wherein at least one of the loading gears further comprises a hook for coupling the gear to the main chassis,
   wherein the main chassis comprises a guide part for receiving and guiding the hook, wherein the guide part comprises an escape part having an extended outer diameter formed at one end of the guide part so as to allow a free entrance of the hook and wherein the hook can be moved by a rotation of the loading gear.

2. The pole base loading apparatus as claimed in claim 1, wherein the hook is integrally formed with the loading gear.

3. The pole base loading apparatus as claimed in claim 1, wherein the guide part further comprises a lesser outer diameter part so as to couple the hook to the main chassis.

4. The pole base loading apparatus as claimed in claim 1, wherein the pair of loading gears comprise:
   a first loading gear rotatably inserted onto a first shaft part projected from a lower part of the main chassis; and
   a second loading gear having a small-scaled gear part rotatably inserted onto a second shaft part projected from the lower part of the main chassis and gear-engaged with the first loading gear, a large-scaled gear part connected to a loading unit and capturing the first loading gear so as to prevent the first loading gear from escaping the first shaft part, and the hook for coupling the second loading gear to the main chassis via the guide part.

5. A main chassis for a magnetic recording/reading device, comprising:
   a head drum for recording information on a tape and reading the information recorded on the tape;
   a pair of pole base units for guiding a tape so that the tape is wound around the head drum;
   a pair of loading gears linked to the pole base units, for rotating around shaft parts, respectively;
   a hook integrally formed with at least one of the loading gears; and
   a guide part installed around a shaft part of at least one of the pairs of loading gears for supporting and guiding the loading gears, wherein the guide part comprises a slit for guiding the hook and coupling the hook to the main chassis, and an escape part having an extended outer diameter formed at one end of the guide part so as to allow a free entrance of the hook.

* * * * *